United States Patent

Gende

[15] 3,689,055
[45] Sept. 5, 1972

[54] LINEAR RATE SPRING MECHANISM
[72] Inventor: Joseph J. Gende, Moline, Ill.
[73] Assignee: Whittaker Corporation
[22] Filed: Nov. 16, 1970
[21] Appl. No.: 89,577

[52] U.S. Cl. ................................................267/150
[51] Int. Cl. ...............................................F16f 13/00
[58] Field of Search...................................267/150 V

[56] References Cited

UNITED STATES PATENTS 2,412,486   11/1946   Wilson.......................267/150
3,155,855   11/1964   Futterer......................267/150

*Primary Examiner*—James B. Marbert
*Attorney*—Donald E. Nist and Jay H. Quartz

[57] ABSTRACT

A device which may take the form of a pressure regulator comprising (1) a spring-biased main shaft slidably positioned within a housing for reciprocal movement along its longitudinal axis and (2) one or more auxiliary springs disposed within the housing at substantially right angles to the main shaft and pivotally connected to the latter through slidable auxiliary shafts and links so that extensive and contractive movement of the auxiliary springs is axial and at right angles to the main shaft thereby providing the latter with a linear (including constant) output.

5 Claims, 5 Drawing Figures

INVENTOR.
JOSEPH J. GENDE,

By Jay H. Quartz
Donald E. [illegible]

ATTORNEYS

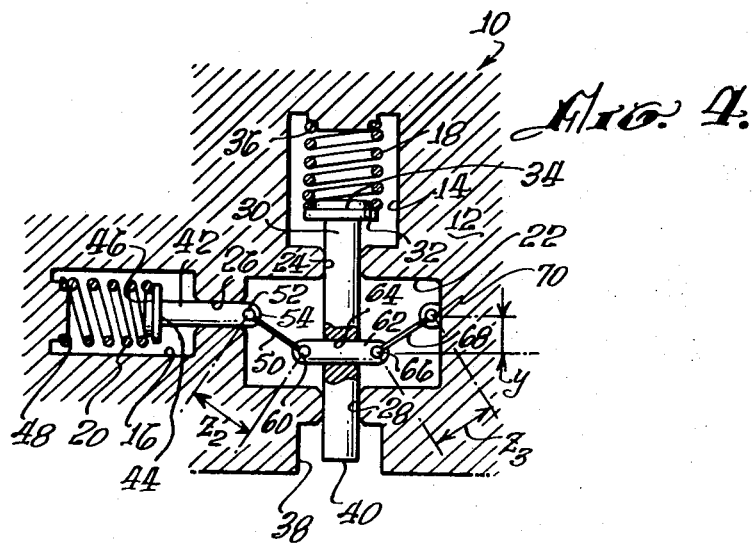
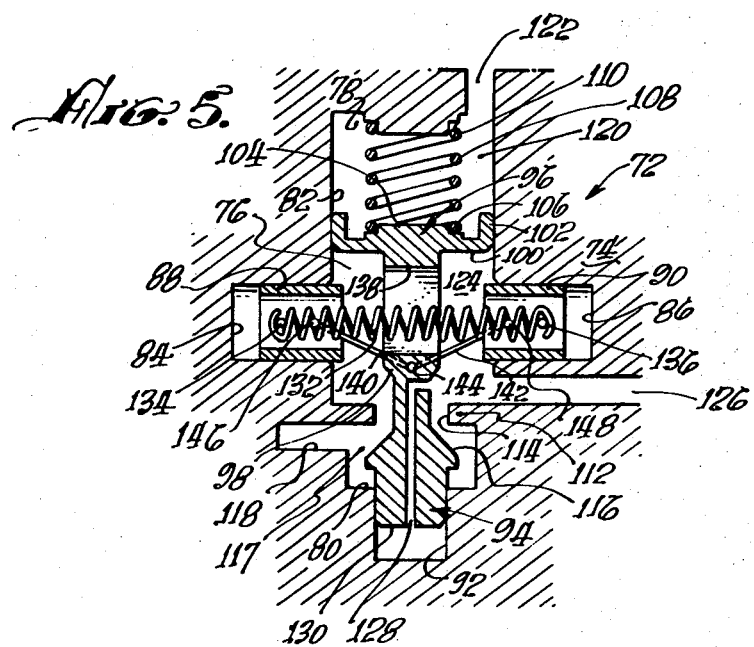

LINEAR RATE SPRING MECHANISM

BACKGROUND OF THE INVENTION

This invention relates to spring-controlled, regulating devices such as pressure regulators.

Many mechanical devices such as pressure regulators, shutoff valves, timing devices and the like employ pistons or shafts which reciprocally move along a portion of their length to provide the desired control or regulation. In many cases, it is desirable that the output or force exerted by these shafts and pistons be linear and in special cases, constant, throughout their total travel.

To accomplish this object, a variety of techniques have heretofore been employed, including weights, tape-wound springs, low rate springs, belleville washers and pneumatic pressure operating on a constant area. None of these mechanisms has been wholly satisfactory. For example, while simple in operation, weights cannot be used where gravitational direction may vary and they are cumbersome whenever any significant force is required. The use of tape-wound springs is limited to applications where low force requirements are present. Sizes become prohibitive with large force requirements when using common springs as low rate springs. Belleville washer springs are expensive to calibrate and motion is limited when utilized for low rate. Constant pneumatic pressure requires a pressure regulator which has leakage characteristics, more parts and size, and provides an equivalent high spring rate when transient conditions are present.

A mechanism which can produce a linear output using auxiliary springs to co-act with a spring-biased shaft is described in U.S. Pat. No. 1,103,020, entitled "Fluid Pressure Regulating Mechanism," issued July 14, 1914 to W. M. Austin. While this mechanism has a low rate output capability, its construction limits it to producing a constant output only when the angle of inclination of the axes of the auxiliary springs is relatively small with respect to the plane perpendicular to the shaft axis. Furthermore, the shaft output is only a mathematical approximation of "constant."

SUMMARY OF THE INVENTION

The mechanism of this invention provides a linear, including constant, shaft output using offsetting spring forces acting at right angles to each other. More specifically, a housing encloses therein (1) a spring-biased main shaft which is slidably positioned within the housing for reciprocal movement along its axis and (2) one ore more auxiliary springs positioned within the housing with their axes at substantially right angles to the main shaft and pivotally connected through auxiliary shafts and link arms to the main shaft so that changes in the force exerted on the main shaft by its spring are offset by the force exerted on it by the auxiliary spring(s). The auxiliary spring rates are selected with respect to the spring rate of the main spring and the auxiliary spring forces are selected with respect to the connecting link length so that the aforementioned offsetting results in a net linear shaft output which is independent of the movement of the main shaft.

One advantage of this invention is that an adjustable, constant force may be referenced throughout a required motion. Additionally, components may be appreciably reduced in size and complexity. Furthermore, increased response to transients may be realized. Another advantage is that components may be made less sensitive to lower frequency vibrations and other external perturbations. Still another advantage is that the herein-described mechanism is mathematically exact, i.e., it can produce an exactly constant output.

DESCRIPTION OF THE FIGURES

FIG. 4 is a partial cross-sectional view of a device incorporating a further modification of the mechanism of FIG. 1 demonstrating the use of a double linkage with only one auxiliary spring.

FIG. 5 is a partial cross-sectional view of a pressure regulator incorporating another embodiment of this invention.

DESCRIPTION OF THE PREFERRED EMBODIMENT

Figure 1:
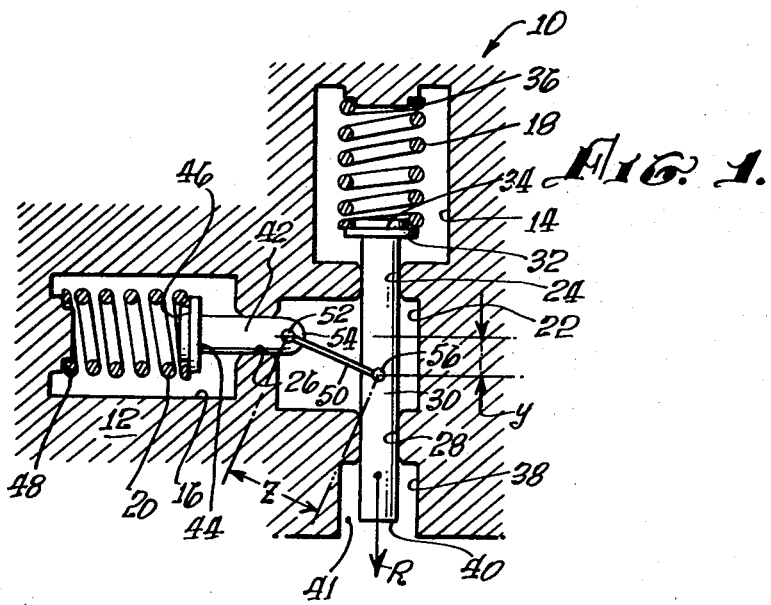
FIG. 1 is a partial cross-sectional view of a device incorporating the linear spring mechanism of this invention.

The herein-described mechanism for producing a linear shaft output which is independent of shaft axial displacement can be used in many applications including: combination pressure regulator and relief or shutoff valves, check valves, valve regulators, clutches and brakes, pumps and compressors, proportional controller, idlers for tension control of belts and chains, preloaders to prevent looseness and backlash, electric motor brushes, scrubbers and doctors, timing devices, constant feed devices, accumulators, force indicators, pressure switches, and switches and relays. This invention will first be described in general terms and, thereafter, will be described with reference to a few specific devices.

In general, within a housing, a main shaft is slidably positioned for reciprocal axial movement in response to the urging of a main spring and in response to an external force, e.g., fluid pressure, opposing the main spring force. One or more auxiliary springs are disposed within the housing with their axes at substantially right angles to the main shaft axis and are pivotally connected to the main shaft through auxiliary shafts and links so that compression movement of the auxiliary springs is essentially at right angles to the main shaft axis. The rate constants of the main and auxiliary springs and the loading of the auxiliary springs are selected so that the net combined force of these springs on the main shaft is linear. That is, a positive spring rate characteristic, a constant resultant force (zero rate), or a negative spring rate characteristic may be achieved.

This invention will now be more specifically described with reference to the Figures and, initially, to FIG. 1 in which the numeral 10 designates a portion of a mechanism, which may be employed in any of the aforementioned devices, to illustrate the basic design and principles of this invention. The mechanism 10 comprises a housing 12 defining a plurality of cavities or chambers including outer chambers 14,16 housing a main spring 18 and an auxiliary spring 20, respectively, and a central chamber 22. The central chamber 22 is in communication with each of the outer chambers 14,16 through channels 24,26 respectively, which are oriented at right angles to each other. A third channel 28 is provided in the housing 12 in axial alignment with channel 24 so that aligned channels 24, 28 form a main guide channel to slidably receive a main shaft 30. One end of the main shaft 30 extends into outer chamber 14 and terminates in a flange 32 which is recessed to form an annular shoulder 34 therein. The main spring 18 is positioned within the outer chamber 14 with one end abutting the annular shoulder 34 and with its other end abutting a similar, aligned shoulder 36 formed in the facing portion of the housing wall so that the main spring axis is in alignment with the main shaft axis.

The other or output end 40 of the main shaft 30 extends into a recess 38 formed in the housing 12 where it may be subject to for example, fluid pressure acting in opposition to the main spring 18.

An auxiliary shaft 42 is slidably received in the auxiliary channel 26 connecting the central chamber 22 with the outer chamber 16 in which the auxiliary spring 20 is located. Similar to the main shaft design, the auxiliary shaft 42 has one end which extends into the outer chamber 16 and which terminates in a flange 44, the outer end of which is recessed to form an annular shoulder 46 therein. The annular shoulder 46 forms a seat against which the inner end of the auxiliary spring 20 abuts with the outer end of the auxiliary spring seated on and abutting an aligned shoulder 48 formed in the outer wall of the housing 12 so that the auxiliary spring axis is in alignment with the auxiliary shaft axis.

A link or pivot arm 50 is pivotally connected at one end to a pin 52 passing transversely through the inner end 54 of the auxiliary shaft 42 which extends into the central chamber 22 and is pivotally connected at its other end to a pin 56 passing transversely through the main shaft 30. The pivot arm 50 is positioned so that it moves in the plane defined by the longitudinal axes of the main and auxiliary shafts 30,42 to prevent twisting of the shafts relative to each other. If a single pivot arm 50 is employed as shown in FIG. 1, slots (not shown) are provided in both the main and auxiliary shafts to permit pivotal movement of the pivot arm relative to the shafts in the aforementioned plane. As an alternative, a pair of pivot arms (not shown) may be employed and these may be pivotally connected to the outer ends of pins in the main and auxiliary shafts 30,42 so that each is equidistant from the plane which includes the axes of both shafts so that the resultant force between the shafts lies in this plane.

The channels 24,26 connecting the outer chambers 14,16, respectively, are at substantially right angles to each other and since the main and auxiliary shafts 30,42 are slidably, axially retained in these channels, respectively, the spring forces also act at substantially right angles to each other. However, the auxiliary spring 20 has a component (which may be zero) which acts along the axis of the main shaft 30 and, thus, directly opposes or reinforces the force exerted by the main spring 18 on the main shaft. With the linkage employed herein to connect the auxiliary spring 20 with the main shaft 30, there is substantially no end play with the result that all of the auxiliary spring force is transmitted to the main shaft. Thus, the net force on the main shaft 30 accurately reflects the characteristics and movement of the main and auxiliary springs 18,20.

The main and auxiliary springs 18,20 may be ordinary springs exhibiting linear characteristics. They are selected, together with the length of the pivot arm 50, so that the combined or net output of the main shaft 30 is linear or, in a special case of the latter, constant.

Figure 2:
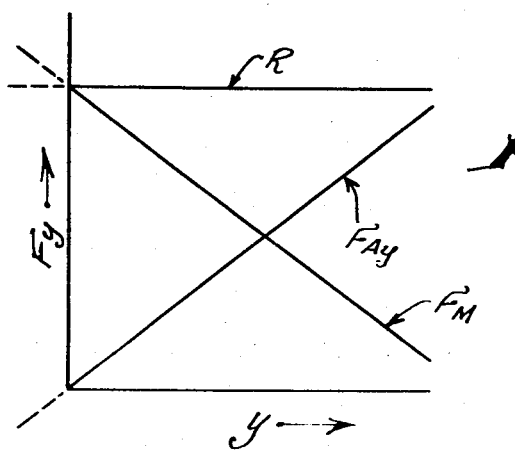
FIG. 2 is a diagrammatic illustration of the spring forces for the mechanism shown in FIG. 1 for the special case of a constant spring force resultant.

The mathematical relationships will now be demonstrated for the device shown in FIG. 1 with reference to the diagram of FIG. 2 in the special case where the combined output of the auxiliary and main springs 20,18 is constant regardless of the main shaft position. The resultant force of the main compression spring 18 in the y direction will decrease linearly from y equals zero to y equals Z as shown by the line designated $F_M$ in FIG. 2. Therefore, to obtain a net constant force, the linear characteristic of the main spring 18 in the y direction must be matched with another linearly increasing spring force in the y direction. Although the force of the auxiliary spring 20 decreases axially as it extends towards the main shaft 18, its component in the y direction actually increases. The latter is represented by $F_{A_y}$ in FIG. 2. The resultant combined force ($R$) will then be constant and independent of y, i.e., independent of movement of the main shaft 30. The equations defining this condition are as follows:

(1)
$$S = Z - \sqrt{Z^2 - y^2}$$

where $S$, the stroke of auxiliary spring 20 = 0 when $y = 0$ (2)
$$\eta = \frac{y}{\sqrt{Z^2 - y^2}}$$

Where $\eta$, the mechanical advantage of auxiliary spring force acting on main shaft 30 in the $y$ direction, $=0$ when $y=0$ and $=\infty$ when $y=Z$ (3)
$$F_A = F_{A_i} - SK_A$$

$F_{A_i}$ = force of auxiliary spring 20 when $S$ and $y=0$
$K_A$ = rate of auxiliary spring 20

(4)
$$F_{A_y} = \eta F_A$$

$F_{A_y}$ = resultant force of $F_A$ in the $y$ direction when $S$ and $y \neq 0$ Combing the above:

(5)
$$F_{A_y} = \frac{y}{\sqrt{Z^2 - y^2}} [F_{A_i} - K_A(Z - \sqrt{Z^2 - y^2})]$$

If $F_{A_i} = K_A Z$ then (from 5) $F_{A_y} = y K_A$ which is linear and constantly increasing as $y$ increases (6)
$$F_{M_y} = F_{M_i} - y K_M$$

$F_{M_i}$ = force of main spring 18 in the $y$ direction when $S$ and $y=0$
$K_M$ = rate of main spring 18

Therefore, to obtain a constant force ($R$) in the $y$ direction, $K_M$ must equal $K_A$ and any desired force, $F_{M_1}$ may be obtained by adjustment of the loaded heighth of main spring 18. The force ($F_M$) of the main spring 18 at $y = Z$ may be zero or it may be a positive value.

The following assumptions have been made in determining the above: friction values are zero; the direction of motion of auxiliary spring 20 and main spring 18 are perpendicular in the same plane; the rate of both springs is constant; and the springs have no inherent hysteresis.

From the foregoing, it will be understood that as the main spring extends, the main spring force approaches a value of zero but the mechanical advantage associated with the auxiliary spring approaches a value of infinity. The net result is that decay of the main spring force is offset by an increase in the $y$ component of the auxiliary spring force thereby resulting in a linear output.

Figure 3:
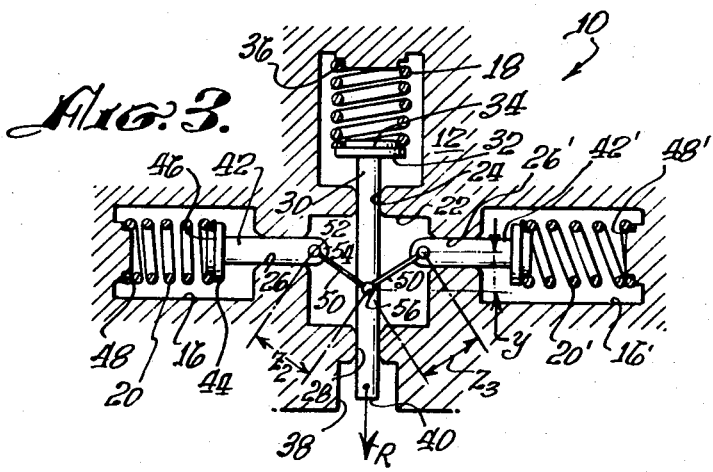
FIG. 3 is a partial cross-sectional view of a device incorporating a modification of the mechanism shown in FIG. 1 demonstrating the use of another auxiliary spring.

The mechanism 10 shown in FIG. 1 employs a single auxiliary spring. However, as previously mentioned, more than one auxiliary spring may be employed. It is only necessary that the axis of each auxiliary spring be oriented substantially perpendicularly to the axis of the main shaft. Thus, auxiliary springs may be positioned radially about the main shaft with their axes in a plane perpendicular to the axis of the main shaft. The use of two auxiliary springs at 180° to each other is shown in FIG. 3. The numerals designating the mechanism 10 of FIG. 3 are the same as used in FIG. 1 except that "-primes" are used for the second auxiliary spring 20' and its related assembly. The mechanism of FIG. 3 is substantially the same as that shown in FIG. 1 except that a second auxiliary spring 20' is disposed at 180° to the other auxiliary spring 20. Opposing the auxiliary shaft 42 is a second auxiliary shaft 42' slidably carried within a channel 26 which is aligned with channel 26. The auxiliary shaft 42' is identical to auxiliary shaft 42 (although this is not necessary) having an annular shoulder 46' in its outer end which serves as a seat for the inner end of auxiliary spring 20' which is carried within the chamber 16' and which has an outer end seated against an annular shoulder 48' in the housing 12 so that the auxiliary shaft and spring 20' are co-axial and also perpendicular to the axis of the main shaft 30.

As shown in FIG. 3, $Z_2 = Z_3$ and if the main 18 and auxiliary springs 20,20' are selected so that $K_M = K_A - K_A$, then $R = F_{M_{y=o}}$ and a constant output will be produced. However, by proper selection of the springs 18,20,20', a linear or constant output can be obtained without making $Z_2 = Z_3$.

In place of one or more of the auxiliary springs (but not all), links or pivot arms may be used to pivotally connect a main shaft directly to the housing wall. A mechanism employing a pivot arm in place of an auxiliary spring is shown in FIG. 4. Except as disclosed hereafter, the numerals employed to designate the components of the mechanism 10 of fig 4 are the same as employed with reference to FIG. 1. In FIG. 4, the main shaft 30 is biased by main spring 18. The force of the latter is offset by the force, acting perpendicularly thereto, of the auxiliary spring 20 acting through the auxiliary shaft 42 and pivot arm 50. In this example, the pivot arm 50 is pivotally connected to a pin 60 transversely positioned in one end of a connector rod 62 which is slidably retained in a transverse channel 64 extending through the main shaft 30. The other end of the connector rod 62 also has a pin 66 transversely positioned therein which is pivotally connected to a pivot arm 68 which, in turn, is pivotally attached to a pin 70 in the housing 12. Since the outer end of the pivot arm 68 is connected to the housing 12 at pin 70, the pin 66 in the connector rod 62 to which the pivot arm 68 is attached can only describe a circle about the housing pin 70 as the main shaft 30 moves. Therefore, movement of the latter is accompanied by transverse sliding movement of the connector rod through the main shaft 30. A constant output is obtained when the pivot arms 50,68 are made equal ($Z_2 = Z_3$) and the springs are selected so that the main spring rate is four times the auxiliary spring rate ($K_M = 4K_A$). Again, a linear output can be obtained by appropriate selection of the main and auxiliary springs 18,20 with unequal pivot arms 50,68.

A modification of the invention is shown in FIG. 5 wherein the numeral 72 designates a pressure regulator comprising a housing 74 having a generally elongated cylinder or chamber 76 formed therein defined by end walls 78,80 and side wall 82. A pair of opposing, aligned cavities 84,86 are formed in opposing faces of side wall 82 and each slidably receives an anchor tube 88,90. A cylinder cavity 92 is found in the bottom end wall 80 and slidably receives a first on lower piston 94 which is connected to a second or upper piston 96 slidably received in the upper portion of the elongated chamber 76 by an intermediate shaft 98 which, in FIG. 5, is shown as being smaller in diameter than either of the pistons 94,96.

Upper piston 96 has a generally disc-shaped portion 100 to conform with the slope of the chamber 76 and the latter has an annular, up-turned flange 102 extending along its periphery in sealing and slidable engagement with side wall 82 of the chamber 76. An axially aligned, cylindrical neck portion 104 extends upwardly from the disc-shaped portion 100 to form a shoulder 106 with the latter which serves as a seat for the lower end of a main spring 108 which biases the upper piston 96 and therefore the intermediate shaft 98 and lower piston 94, to urge it downwardly and to urge the lower piston downwardly into the cylinder cavity 92. The other or upper end of the main spring 108 seats against a shoulder 110 formed in the upper end wall 78 of the chamber 76.

A portion of the side wall 82 of the housing 74 extends radially into the chamber 76 to form a collar 112 having an axial aperture or passageway 114 therethrough. The passageway 114 is larger in diameter than the intermediate shaft 98 but is smaller than the diameter of the lower piston 94 which has a downwardly sloping shoulder 116 for engagement with the collar 112 as the piston 94 moves upwardly.

Three sub-chambers are effectively formed in the main elongated chamber 76. An inlet pressure sub-chamber 117 is defined by the lower portion of the side wall 82, the bottom end wall 80 and the collar 112. This inlet sub-chamber 117 communicates with an inlet pressure source (not shown) through an inlet port 118. A reference pressure sub-chamber 120 is defined by the upper portion of the side wall 80, the upper end wall 78 and by the upper piston 96. This sub-chamber 120 communicates through a port 122 with a reference pressure source (not shown). The remaining portion of the chamber 76 between the inlet and reference sub-chambers 117,120 forms an intermediate sub-chamber 124 which communicates, through an outlet channel 126, with a regulated pressure zone (not shown). When the lower piston 80 has moved upwardly to close the passageway 114 at which position it is completely free of the cylinder cavity 92, the intermediate and inlet sub-chambers 124,117 are in communication through a by-pass channel 128 which extends from a lower face 130 of the lower piston 94 through the latter and out a side of the intermediate shaft 98 in the intermediate sub-chamber. By-pass channel 128 is utilized to provide equalized pressure opposite the effective areas influenced by inlet pressure acting on lower piston 94.

The reference pressure and the force exerted by the main spring 108 act together to urge the pistons 94,96 and intermediate shaft downwardly through the elongated chamber 76. Acting against this combination of forces is the inlet pressure which may vary greatly but is balanced by equalizing the diameter of lower piston 94 with the diameter of the passageway 114 through axial movement of the piston 94.

In operation, when the inlet pressure is higher than the reference pressure, the lower piston 94 will be forced into its upper position so that the shoulder 116 will engage the collar 112 to thereby close the passageway 114. On the other hand, when the inlet pressure is less than the reference pressure, the lower piston 94 will be forced downwardly into the cavity 92 in the lower end of the chamber 76 leaving the passageway 114 at its required opening so that a demanded amount of fluid will be able to flow through the passageway and out the outlet channel 126. By proper selection of the springs 108,132, as previously described, the movement of the lower piston 94 between these two extreme positions can be constant. That is, regardless of the flow demand through outlet channel 126, the piston 94 will position itself to provide a constant regulated pressure value.

From the foregoing description and from the Figures, it can be seen that the herein-described spring mechanism can be employed in various forms in a variety of devices. Regardless of the form that the mechanism takes, or its application, inherent in each mechanism of this invention is the use of main and auxiliary springs which act axially along a main shaft and at right angles to that main shaft, respectively, throughout the movement of the main shaft. The latter is provided with a linear force resultant or output by proper selection, as described herein, of the auxiliary spring rate and force with respect to the main spring rate and to the length of the pivot arms connecting the main shaft with the slide means to which the auxiliary spring is operably connected. This linear output is obtainable over a main shaft movement equal to twice the length of the shortest pivot arms. For example, a constant shaft resultant ($R$) is obtained with the mechanism of FIG. 1 with $K_a = K_M$ over a main shaft movement equal to $2Z$. This is shown diagrammatically in FIG. 2 by the dotted lines representing $F_M$, $F_{A_y}$ and $R$ in the region $y < o$. Algebraic addition of these values for $F_M$ and $F_{A_y}$ produces the constant $R$.

I claim:

1. A device for producing a linear shaft output force, comprising:
a housing;
a main shaft slidably positioned within said housing for reciprocal movement along its longitudinal axis, said main shaft capable of said reciprocal movement in response to the combination of an external force acting on said shaft and
main spring means carried within said housing and axially aligned with said main shaft throughout said movement of said main shaft for urging said main shaft axially in a direction opposite to the urging of said external force;
slide means positioned within said housing at substantially right angles to said main shaft for reciprocal movement with respect to said main shaft;
guide means carried within said housing for slidably receiving said slide means;
rigid link means pivotally interconnecting said slide means and said main shaft; and
auxiliary spring means carried within said housing in axial alignment with said slide means throughout the movement of said slide means, said auxiliary spring means operably connected to said slide means for urging said slide means toward said main shaft, the spring rate of said auxiliary spring means selected with respect to the spring rate of said main spring means and the spring force of said auxiliary spring means selected with respect to the length of said rigid link means so that the combined force of said main and said auxiliary spring means on said main shaft in its axial direction is substantially linear.

2. The device of claim 1 wherein:
said guide means comprises a pair of opposing, aligned cavities formed in said housing on opposite sides of said main shaft, the axes of said cavities being coplanar with said longitudinal axis of said main shaft;
said slide means comprises a pair of tubes slidably received in said aligned cavities;
and said auxiliary spring means comprises a single coil spring connected at each end to one of said tubes, said coil spring passing through a transverse aperture in said main shaft.

3. The device of claim 1 wherein:
said guide means comprises a first channel formed in said housing; and
said slide means comprises a first auxiliary shaft slidably received in said first channel, said first auxiliary shaft operably connected at its one end with said spring means and pivotally connected at its other end with said rigid link means.

4. The device of claim 3 wherein:
said guide means includes, in addition, a second channel formed in said housing in alignment with said first channel, said first and second channels being located on opposite sides of said main shaft;
said slide means includes, in addition, a second auxiliary shaft slidably received in said second channel;
said rigid link means comprises a pair of pivot arms, each said pivot arm pivotally connected at one end to said main shaft and at its other end to one of said first and said second auxiliary shafts;
and said auxiliary spring means comprises a pair of coil springs axially aligned with said auxiliary shafts, each said coil spring abutting at one end against said housing and at its other end against an end of one of said auxiliary shafts, whereby each said auxiliary shaft is urged by one of said coil springs toward said main shaft and said urging is transmitted to said main shaft by said pivot arms.

5. The device of claim 3 wherein:

said rigid link means comprises a first and a second pivot arm, said first pivot arm pivotally connected at its one end with said first auxiliary shaft and at its other end with a first end of a transverse shaft slidably received in a transverse aperture through said main shaft, a second end of said transverse shaft being pivotally connected to one end of said second pivot arm, the other end of said second pivot arm pivotally connected to a fixed point in said housing, whereby said reciprocal movement of said main shaft is accompanied by transverse, reciprocating movement of said transverse shaft perpendicular to said longitudinal axis of said main shaft.

* * * * *